(12) United States Patent
Yamazaki et al.

(10) Patent No.: US 8,996,440 B2
(45) Date of Patent: Mar. 31, 2015

(54) INFORMATION PROCESSING APPARATUS, INFORMATION PROCESSING METHOD, AND PROGRAM

(75) Inventors: Takeshi Yamazaki, Kanagawa (JP); Seiji Wada, Kanagawa (JP); Yoshihiro Wakita, Tokyo (JP); Koji Kashima, Kanagawa (JP); Natsuki Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 13/474,159

(22) Filed: May 17, 2012

(65) Prior Publication Data

US 2012/0310873 A1 Dec. 6, 2012

(30) Foreign Application Priority Data

May 30, 2011 (JP) ................. 2011-120453

(51) Int. Cl.
*G06N 5/02* (2006.01)
*G06Q 10/10* (2012.01)

(52) U.S. Cl.
CPC .................. *G06Q 10/109* (2013.01)
USPC ......................................................... 706/47

(58) Field of Classification Search
None
See application file for complete search history.

(56) References Cited

U.S. PATENT DOCUMENTS

| | | | |
|---|---|---|---|
| 5,040,123 A * | 8/1991 | Barber et al. | 700/100 |
| 5,237,508 A * | 8/1993 | Furukawa et al. | 700/100 |
| 6,088,659 A * | 7/2000 | Kelley et al. | 702/62 |
| 6,199,068 B1 * | 3/2001 | Carpenter | 1/1 |
| 6,918,089 B2 * | 7/2005 | Uchida et al. | 715/751 |
| 7,370,282 B2 * | 5/2008 | Cary | 715/772 |
| 7,586,892 B2 * | 9/2009 | Patt-Shamir et al. | 370/346 |
| 7,602,799 B2 * | 10/2009 | Ikeda et al. | 370/419 |
| 7,630,095 B2 * | 12/2009 | Tarumi | 358/1.15 |
| 7,711,583 B2 * | 5/2010 | Epstein et al. | 705/3 |
| 7,784,078 B2 * | 8/2010 | Ohnuma et al. | 725/91 |
| 7,957,987 B2 * | 6/2011 | Langerman | 705/5 |
| 8,843,387 B2 * | 9/2014 | Ricketts | 705/7.12 |
| 2002/0077879 A1 * | 6/2002 | Uchida et al. | 705/9 |
| 2004/0064350 A1 * | 4/2004 | Hanazato et al. | 705/7 |
| 2004/0158858 A1 * | 8/2004 | Paxton et al. | 725/42 |
| 2004/0158870 A1 * | 8/2004 | Paxton et al. | 725/115 |
| 2005/0022251 A1 * | 1/2005 | Ohnuma et al. | 725/134 |
| 2005/0237930 A1 * | 10/2005 | Patt-Shamir et al. | 370/229 |
| 2005/0246208 A1 * | 11/2005 | Langerman | 705/5 |
| 2006/0053149 A1 * | 3/2006 | Iwasaki et al. | 707/102 |
| 2006/0178921 A1 * | 8/2006 | Chuang et al. | 705/8 |
| 2006/0212904 A1 * | 9/2006 | Klarfeld et al. | 725/46 |
| 2006/0227374 A1 * | 10/2006 | Tarumi | 358/1.15 |
| 2007/0168067 A1 * | 7/2007 | Yaji et al. | 700/100 |
| 2007/0288923 A1 * | 12/2007 | Nishikawa et al. | 718/100 |
| 2008/0215409 A1 * | 9/2008 | Van Matre | 705/8 |

(Continued)

FOREIGN PATENT DOCUMENTS

JP 2001-344352 12/2001

*Primary Examiner* — Kakali Chaki
*Assistant Examiner* — Fuming Wu
(74) *Attorney, Agent, or Firm* — Sony Corporation of America

(57) ABSTRACT

An information processing apparatus configured to create a schedule to be presented to a user includes an estimation unit and a creation unit. The estimation unit is configured to estimate whether or not the user acts in accordance with a first schedule including a task to do for accomplishing a preset aim. The creation unit is configured to create, when estimated that the user does not act in accordance with the first schedule, a new second schedule for accomplishing the aim from a state of the user who acts without following the first schedule.

9 Claims, 12 Drawing Sheets

(56) References Cited

U.S. PATENT DOCUMENTS

| | | |
|---|---|---|
| 2008/0228314 A1* | 9/2008 | Sjostrand et al. ............. 700/175 |
| 2009/0043632 A1* | 2/2009 | Ricketts ............................ 705/9 |
| 2009/0043635 A1* | 2/2009 | Mori .................................. 705/9 |
| 2009/0172679 A1* | 7/2009 | Yoshida et al. ............... 718/102 |
| 2010/0217626 A1* | 8/2010 | Epstein et al. ..................... 705/3 |
| 2011/0125698 A1* | 5/2011 | Rome et al. ...................... 706/50 |
| 2011/0307283 A1* | 12/2011 | Johnson ........................ 705/7.13 |
| 2012/0166635 A1* | 6/2012 | Tokuyama ..................... 709/224 |
| 2012/0310873 A1* | 12/2012 | Yamazaki et al. .............. 706/47 |
| 2013/0097547 A1* | 4/2013 | Ohwa et al. ................... 715/772 |
| 2013/0166055 A1* | 6/2013 | Ishibashi et al. .............. 700/100 |

\* cited by examiner

FIG.2

| Aim | Period | Activity schedule |
|---|---|---|
| Improvement in strength | | |
| | | |
| Diet | | |
| | | |
| | | |
| ⋮ | ⋮ | ⋮ |

41

FIG.3
Activity schedule since April 1
| Time | Activity | Expected amount of activity |
|---|---|---:|
| 7:00—8:00 | Meal (Breakfast) | 100 |
| 12:00—13:00 | Meal (Lunch) | 150 |
| 18:00—19:00 | Sport (Jogging) | 1800 |
| 20:00—21:00 | Meal (Dinner) | 200 |
61
FIG.4
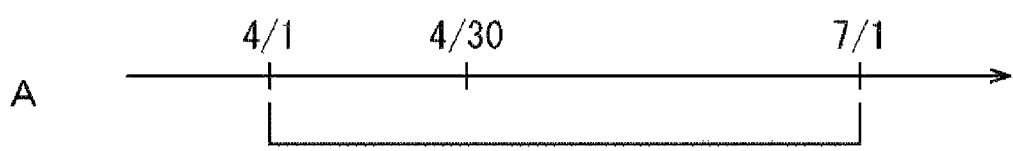
A
Fix up a schedule for improvement in strength within three months
On April 30, sufficient sport was not able to be done
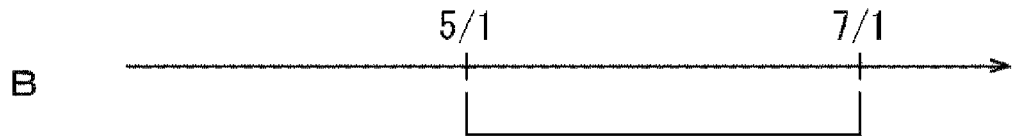
B
Fix up a schedule since May 1 again

FIG.5A

Activity schedule on May 1    81

| Time | Activity | Expected amount of activity |
|---|---|---|
| 7:00−8:00 | Meal (Breakfast) | 100 |
| 12:00−13:00 | Meal (Lunch) | 150 |
| 18:00−18:30 | Sport (Jogging) | 900 |
| 18:30−19:30 | Sport (Yoga) | 600 |
| 20:00−21:00 | Meal (Dinner) | 200 |

FIG.5B

Activity schedule on May 2    82

| Time | Activity | Expected amount of activity |
|---|---|---|
| 7:00−8:00 | Meal (Breakfast) | 100 |
| 12:00−13:00 | Meal (Lunch) | 150 |
| 18:00−18:45 | Sport (Jogging) | 1350 |
| 18:45−19:15 | Sport (Yoga) | 300 |
| 20:00−21:00 | Meal (Dinner) | 200 |

FIG.5C

Activity schedule since May 3    83 (61)

| Time | Activity | Expected amount of activity |
|---|---|---|
| 7:00−8:00 | Meal (Breakfast) | 100 |
| 12:00−13:00 | Meal (Lunch) | 150 |
| 18:00−19:00 | Sport (Jogging) | 1800 |
| 20:00−21:00 | Meal (Dinner) | 200 |

FIG.6

| Upper tier | Lower tier | Expected amount of activity | Actual amount of activity | Difference | Deviation degree |
|---|---|---|---|---|---|
| Sport | Jogging | 1800 | 500 | 1300 | 0.72 |
| | Yoga | 0 | 0 | 0 | 0 |
| Meal | Breakfast | 100 | 110 | 10 | 0.1 |
| | Lunch | 150 | 140 | 10 | 0.07 |
| | Dinner | 200 | 220 | 20 | 0.1 |

Activity schedule since April 1    101

| Time | Activity | Expected amount of activity |
|---|---|---|
| 7:00—8:00 | Meal (Breakfast) | 100 |
| 12:00—13:00 | Meal (Lunch) | 150 |
| 18:00—18:30 | Sport (Jogging) | 900 |
| 18:30—19:00 | Sport (Yoga) | 300 |
| 20:00—21:00 | Meal (Dinner) | 200 |

| Upper tier | Lower tier | Expected amount of activity | Actual amount of activity | Difference | Deviation degree |
|---|---|---|---|---|---|
| Sport | Jogging | 900 | 100 | 800 | 0.88 |
|  | Yoga | 300 | 50 | 250 | 0.83 |
| Meal | Breakfast | 100 | 110 | 10 | 0.1 |
|  | Lunch | 150 | 140 | 10 | 0.07 |
|  | Dinner | 200 | 220 | 20 | 0.1 |

FIG.10A

Activity schedule on May 1 /121

| Time | Activity | Expected amount of activity |
|---|---|---|
| 7:00—8:00 | Meal (Breakfast) | 100 |
| 12:00—13:00 | Meal (Lunch) | 150 |
| 18:00—18:10 | Sport (Jogging) | 300 |
| 18:30—18:35 | Sport (Yoga) | 50 |
| 20:00—21:00 | Meal (Dinner) | 200 |

FIG.10B

Activity schedule on May 2 /122

| Time | Activity | Expected amount of activity |
|---|---|---|
| 7:00—8:00 | Meal (Breakfast) | 100 |
| 12:00—13:00 | Meal (Lunch) | 150 |
| 18:00—18:20 | Sport (Jogging) | 600 |
| 18:30—18:40 | Sport (Yoga) | 100 |
| 20:00—21:00 | Meal (Dinner) | 200 |

FIG.10C

Activity schedule on May 3 /123

| Time | Activity | Expected amount of activity |
|---|---|---|
| 7:00—8:00 | Meal (Breakfast) | 100 |
| 12:00—13:00 | Meal (Lunch) | 150 |
| 18:00—18:30 | Sport (Jogging) | 900 |
| 18:30—18:45 | Sport (Yoga) | 150 |
| 20:00—21:00 | Meal (Dinner) | 200 |

FIG.10D

Activity schedule on May 4 /124

| Time | Activity | Expected amount of activity |
|---|---|---|
| 7:00—8:00 | Meal (Breakfast) | 100 |
| 12:00—13:00 | Meal (Lunch) | 150 |
| 18:00—18:30 | Sport (Jogging) | 900 |
| 18:30—18:50 | Sport (Yoga) | 200 |
| 20:00—21:00 | Meal (Dinner) | 200 |

FIG.10E

Activity schedule on May 5 /125

| Time | Activity | Expected amount of activity |
|---|---|---|
| 7:00—8:00 | Meal (Breakfast) | 100 |
| 12:00—13:00 | Meal (Lunch) | 150 |
| 18:00—18:30 | Sport (Jogging) | 900 |
| 18:30—18:55 | Sport (Yoga) | 250 |
| 20:00—21:00 | Meal (Dinner) | 200 |

FIG.10F

Activity schedule since May 6 /126(101)

| Time | Activity | Expected amount of activity |
|---|---|---|
| 7:00—8:00 | Meal (Breakfast) | 100 |
| 12:00—13:00 | Meal (Lunch) | 150 |
| 18:00—18:30 | Sport (Jogging) | 900 |
| 18:30—19:00 | Sport (Yoga) | 300 |
| 20:00—21:00 | Meal (Dinner) | 200 |

FIG.11

| Upper tier | Lower tier | Expected amount of activity | Actual amount of activity | Difference | Deviation degree |
|---|---|---|---|---|---|
| Sport | Jogging | 900 | 460 | 340 | 0.38 |
|  | Yoga | 300 | 310 | 10 | 0.03 |
| Meal | Breakfast | 100 | 110 | 10 | 0.1 |
|  | Lunch | 150 | 140 | 10 | 0.07 |
|  | Dinner | 200 | 220 | 20 | 0.1 |

FIG.12A

Activity schedule on May 1    141

| Time | Activity | Expected amount of activity |
|---|---|---|
| 7:00—8:00 | Meal (Breakfast) | 100 |
| 12:00—13:00 | Meal (Lunch) | 150 |
| 18:00—18:20 | Sport (Jogging) | 600 |
| 18:30—19:30 | Sport (Yoga) | 300 |
| 20:00—21:00 | Meal (Dinner) | 200 |

FIG.12B

Activity schedule on May 2    142

| Time | Activity | Expected amount of activity |
|---|---|---|
| 7:00—8:00 | Meal (Breakfast) | 100 |
| 12:00—13:00 | Meal (Lunch) | 150 |
| 18:00—18:15 | Sport (Jogging) | 450 |
| 18:15—19:30 | Sport (Yoga) | 450 |
| 20:00—21:00 | Meal (Dinner) | 200 |

FIG.12C

Activity schedule since May 3    143

| Time | Activity | Expected amount of activity |
|---|---|---|
| 7:00—8:00 | Meal (Breakfast) | 100 |
| 12:00—13:00 | Meal (Lunch) | 150 |
| 18:00—18:15 | Sport (Jogging) | 450 |
| 18:15—20:00 | Sport (Yoga) | 1050 |
| 20:00—21:00 | Meal (Dinner) | 200 |

INFORMATION PROCESSING APPARATUS, INFORMATION PROCESSING METHOD, AND PROGRAM

CROSS REFERENCES TO RELATED APPLICATIONS

The present application claims priority to Japanese Priority Patent Application JP 2011-120453 filed in the Japan Patent Office on May 30, 2011, the entire content of which is hereby incorporated by reference.

BACKGROUND

The present disclosure relates to an information processing apparatus, an information processing method, and a program. In particular, the present disclosure relates to an information processing apparatus, an information processing method, and a program that are capable of changing a schedule fixed so that a user can accomplish a preset aim, as appropriate in accordance with a changing activity pattern of the user, for example.

For example, there is an activity estimation technique of estimating activities of a user wearing a biological sensor based on a pulse or the like obtained by the biological sensor attached to the body of the user (e.g., see Japanese Patent Application Laid-open No. 2001-344352).

It should be noted that the estimated activities of the user are referred to, for example, when a trainer or the like in a fitness club provides an advice on a life style to a user being on a diet.

That is, for example, when drinking or eating late at night is estimated as an activity of the user, the user will be provided with an advice from the trainer or the like, "you have to avoid drinking or eating late at night which leads to gain weight."

Further, for example, the trainer or the like presents the user with a daily schedule created based on the estimated activities of the user.

If the user acts in accordance with the daily schedule presented by the trainer or the like, the aim to reduce weight can be accomplished with a high degree of success after a predetermined period.

SUMMARY

However, an activity pattern of the user is hardly constant, and changes depending on situations.

That is, for example, if the user has some urgent business, it takes time for the user to deal with the urgent business, and the user is not able to act in accordance with the schedule presented by the trainer or the like.

In this case, since the user loses a schedule defining activities to do after that, it may be impossible to accomplish the aim to reduce weight.

Further, since the trainer or the like creates a daily schedule based on his or her experiences or statistical data, the created daily schedule is not necessarily appropriate for the activity pattern of the user.

In view of the above circumstances, it is desirable to change a schedule fixed so that a user can accomplish a preset aim, as appropriate in accordance with a changing activity pattern of the user.

According to an embodiment of the present disclosure, there is provided an information processing apparatus configured to create a schedule to be presented to a user. The apparatus includes an estimation unit and a creation unit. The estimation unit is configured to estimate whether or not the user acts in accordance with a first schedule including a task to do for accomplishing a preset aim. The creation unit is configured to create, when estimated that the user does not act in accordance with the first schedule, a new second schedule for accomplishing the aim from a state of the user who acts without following the first schedule.

The creation unit may create the second schedule to become the same as the first schedule after a predetermined period of time.

The creation unit may create the second schedule having similarity increasing as the period of time is elapsed, the similarity indicating a degree of similarity between a task included in the first schedule and a task included in the second schedule.

The creation unit may create the second schedule based on an offset degree indicative of an offset between the task included in the first schedule and an activity of the user.

The creation unit may create the second schedule in which the task is changed such that the similarity of the task increases in a priority order of the task based on the offset degree.

A weighting unit configured to apply a weight associated with the task to the offset degree corresponding thereto may be further provided. The creation unit may create the second schedule based on the offset degree weighted for the task.

A measurement unit configured to measure activity information indicative of the activity of the user may be further provided. The estimation unit may estimate, based on the activity information, whether or not the user acts in accordance with the first schedule.

The creation unit may create, based on a history of an estimation result of the estimation unit, the second schedule different from the first schedule.

According to an embodiment of the present disclosure, there is provided an information processing method for an information processing apparatus configured to create a schedule to be presented to a user. The method includes, by the information processing apparatus, estimating whether or not the user acts in accordance with a first schedule including a task to do for accomplishing a preset aim, and creating, when estimated that the user does not act in accordance with the first schedule, a new second schedule for accomplishing the aim from a state of the user who acts without following the first schedule.

According to an embodiment of the present disclosure, there is provided a program causes a computer of an information processing apparatus configured to create a schedule to be presented to a user to function as an estimation unit and a creation unit. The estimation unit is configured to estimate whether or not the user acts in accordance with a first schedule including a task to do for accomplishing a preset aim. The creation unit is configured to create, when estimated that the user does not act in accordance with the first schedule, a new second schedule for accomplishing the aim from a state of the user who acts without following the first schedule.

According to the embodiments of the present disclosure, whether or not the user acts in accordance with a first schedule including a task to do for accomplishing a preset aim is estimated, and when estimated that the user does not act in accordance with the first schedule, a new second schedule for accomplishing the aim from a state of the user who acts without following the first schedule is created.

According to the embodiments of the present disclosure, it becomes possible to change a schedule fixed so that the user can accomplish a preset aim, as appropriate in accordance with a changing activity pattern of the user.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 2 is a diagram showing an example of an initial setting table;

FIG. 3 is a diagram showing an example of an initial activity schedule;

FIG. 4 is a diagram showing an example of an aim and a period that have been set by the user;

FIG. 5 are diagrams each showing an example of a new activity schedule;

FIG. 6 is a diagram showing an example of an estimation method of estimating whether or not the user acted in accordance with an original activity schedule;

FIG. 8 is a diagram showing another example of the initial activity schedule;

FIG. 9 is another diagram showing an example of the estimation method of estimating whether or not the user acted in accordance with the original activity schedule;

FIG. 10 are other diagrams each showing an example of the new activity schedule;

FIG. 11 is still another diagram showing an example of the estimation method of estimating whether or not the user acted in accordance with the original activity schedule;

FIG. 12 are diagrams showing examples of states in which the initial activity schedule is updated.

DETAILED DESCRIPTION

Hereinafter, embodiments according to the present disclosure (hereinafter, referred to as embodiments) will be described. It should be noted that the descriptions will be made in the following order.
1. First embodiment (example in case of enabling user to reasonably act in accordance with original activity schedule even when user did not follow original activity schedule)
2. Second embodiment (example in case of modifying tasks in predetermined priority order)
3. Third embodiment (example in case of updating original activity schedule)
4. Modified example
(1. First Embodiment)
[Configuration Example of Information Processing Apparatus 1]

Figure 1:
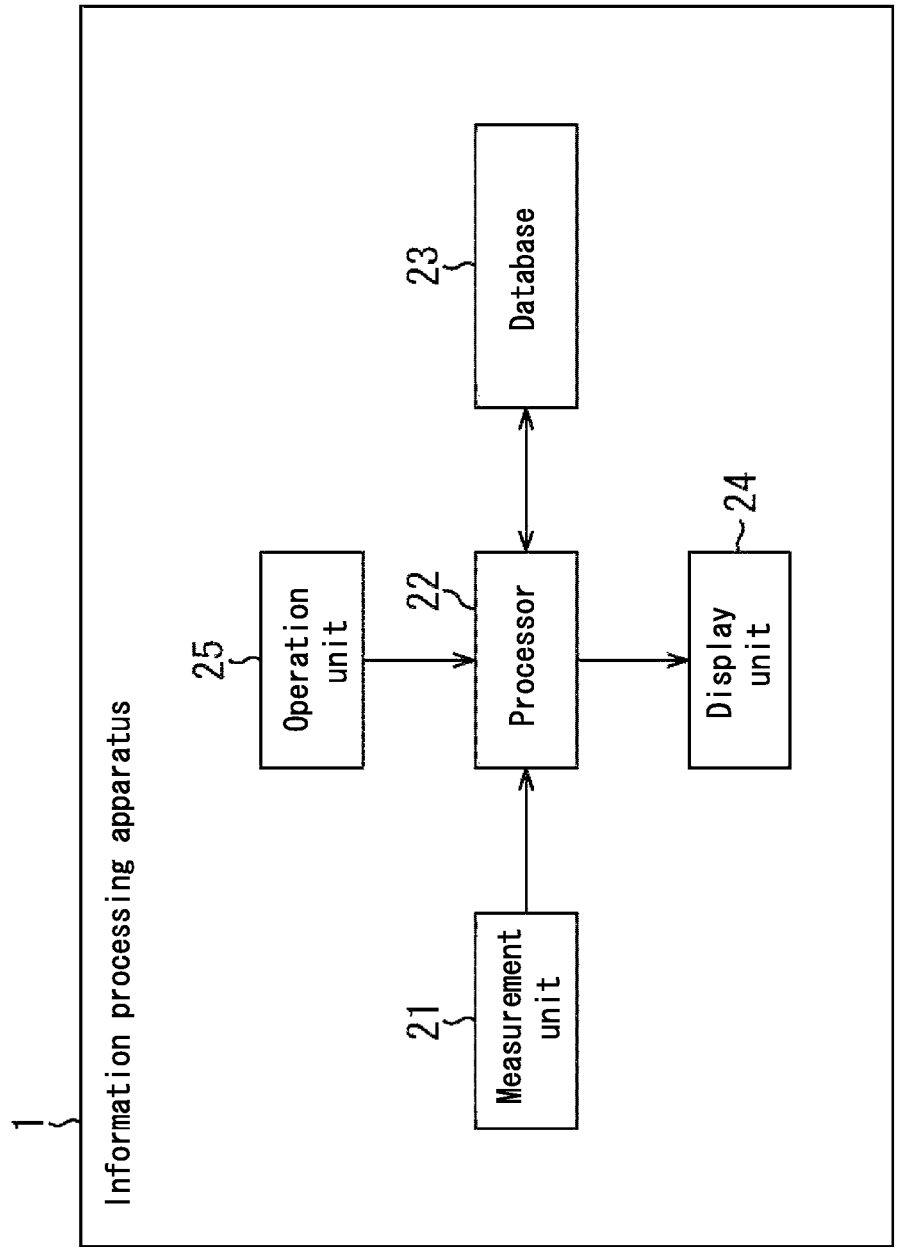
FIG. 1 is a block diagram showing a configuration example of an information processing apparatus according to an embodiment of the present disclosure.

FIG. 1 shows a configuration example of an information processing apparatus 1 according to a first embodiment.

It should be noted that the information processing apparatus 1 is, for example, attached to a user for use, and presents the user with an activity schedule fixed so that the user can accomplish a preset aim.

When the user performed an activity different from the activity schedule presented by the information processing apparatus 1, the information processing apparatus 1 presents a new activity schedule fixed so that the user can accomplish the aim from a current state of the user.

The information processing apparatus 1 includes a measurement unit 21, a processor 22, a database 23, a display unit 24, and an operation unit 25.

The measurement unit 21 detects, for example, a motion and a pulse of the user wearing the information processing apparatus 1, and measures, based on a detection result, an amount of activity of the user and a time when the detection is performed. Then, the measurement unit 21 supplies the measured amount of activity and time to the processor 22 as activity information indicative of information on activities of the user.

It should be noted that the amount of activity is set as a value varying depending on the activities of the user. That is, for example, the amount of activity is set as an amount depending on an activity of the user, and the activity of the user can be estimated based on the amount of activity.

Specifically, for example, when the user plays sport having a high load, the amount of activity is set to be large. On the other hand, when the user plays sport having a low load, the amount of activity is set to be small.

The processor 22 causes the display unit 24 to display a setting screen for inputting, for example, an aim that the user desires to accomplish (e.g., improvement in strength) and a period within which the user desires to accomplish the aim (e.g., three months).

In order to do so, the user uses the operation unit 25 to make an input operation of inputting an aim, a period, and the like to a setting screen. In response to this, the operation unit 25 supplies an operation signal corresponding to the input operation by the user to the processor 22.

Based on the operation signal from the operation unit 25, the processor 22 acquires the aim, the period, and the like input by the user making the input operation.

Then, the processor 22 refers to an initial setting table 41 (FIG. 2) stored in advance in the database 23, reads out an activity schedule 61 associated with the acquired aim, period, and the like from the database 23, and supplies the activity schedule to the display unit 24 for display.

Here, in the initial setting table 41, as shown in FIG. 2, aims (e.g., diet, improvement in strength, etc.) set by the user, each of which is associated with a period for accomplishing the aim and (IDs of) activity schedules for accomplishing the aims, are described.

Further, in the activity schedule 61, as shown in FIG. 3, tasks to do for each day within three months between April 1 and July 1 are described. That is, for example, in the activity schedule 61, a plurality of periods of time, an activity task for each period of time, and an expected amount of activity indicative of an amount of activity expected with respect to the activity for each period of time are described.

It should be noted that the initial setting table 41 and the activity schedule 61 are, for example, created based on statistical data obtained from a plurality of users and stored in advance in the database 23.

In addition, the processor 22 estimates whether or not the user acted in accordance with the activity schedule 61, based on the activity information from the measurement unit 21.

When estimated that the user did not act in accordance with the activity schedule 61, the processor 22 creates a new activity schedule based on a current state of the user, and causes the display unit 24 to display it. Accordingly, for accomplishing the aim, the user will act in accordance with the new activity schedule as much as possible.

The database 23 stores in advance, for example, the initial setting table 41 as shown in FIG. 2 and activity schedules associated with the IDs of the activity schedules that are described in the initial setting table 41. It should be noted that the initial setting table 41 and the activity schedules stored in the database 23 are appropriately updated to the latest data, for example, based on new data supplied via a network such as an Internet (not shown).

By the way, in the first embodiment, the information processing apparatus 1 includes the database 23. However, the database 23 may be connected to the information processing apparatus 1 via a network represented by the Internet or the like.

In this case, the information processing apparatus 1 to be attached to the user can be downsized. Thus, it becomes possible to reduce the burden on the user in attachment of the information processing apparatus 1 to the user.

The display unit 24 displays, under control by the processor 22, the activity schedule to be presented to the user. In this manner, the information processing apparatus 1 can present the activity schedule to the user.

It should be noted that a method of presenting the activity schedule to the user is not limited thereto. Alternatively, for example, the activity schedule may be audibly presented to the user. That is, in order to present a schedule including tasks to do for accomplishing a preset aim, an activity schedule may be displayed as the schedule or the schedule may be audibly output and presented.

For example, the operation unit 25 is constituted of an operation button and the like, and supplies a corresponding operation signal to the processor 22 in response to an operation by the user.

Next, FIG. 4 shows examples of the aim and the period that have already been set by the user making an input operation.

For example, as shown in A in FIG. 4, a case where the user inputs, by an input operation using the operation unit 25, an improvement in strength as an aim and three months between April 1 and July 1 as a period for accomplishing the aim will be considered.

In this case, the operation unit 25 supplies a operation signal corresponding to the input operation by the user to the processor 22.

In response to the operation signal from the operation unit 25, the processor 22 refers to the initial setting table 41 stored in advance in the database 23. Then, the processor 22 reads out from the database 23 the activity schedule 61 such that an improvement in strength can be achieved within three months, and supplies it to the display unit 24 for display.

If the user acts in accordance with the activity schedule 61 displayed on the display unit 24 for three months between April 1 and July 1, the user can achieve an improvement in strength with a high degree of success.

However, for example, if the user has some urgent business, it takes time for the user to deal with the urgent business with the result that the user may not be able to act in accordance with the activity schedule 61.

That is, for example, there is a possibility that the user acts in accordance with the activity schedule 61 between April 1 and April 29 as shown in A in FIG. 4, but acts without following the activity schedule 61 on April 30.

Specifically, for example, there is a possibility that the user needed to jog between the points of time 18:00 and 19:00 in accordance with the activity schedule 61, but he or she was not able to jog due to some urgent business.

In this case, the processor 22 will create a new activity schedule in which tasks since the next day of April 30 are described as shown in B in FIG. 4, based on a state of the user who was not able to jog between the points of time 18:00 and 19:00 on April 30.

Next, FIG. 5 show examples of activity schedules 81 to 83 in which tasks since the next day of April 30, that is, tasks for two months between May 1 and July 1 are described.

The activity schedule 81 shown in FIG. 5A indicates a schedule in which tasks on May 1 being the next day of April 30 are described. Further, the activity schedule 82 shown in FIG. 5B indicates a schedule in which tasks on May 2 are described. In addition, the activity schedule 83 shown in FIG. 5C indicates a schedule in which tasks since May 3 are described.

It should be noted that the activity schedules 81 to 83 are those that are created so that the user can reasonably act in accordance with an original activity schedule 61 from the state in which the user was not able to jog on April 30.

In the activity schedule 81 on May 1, 30 minutes between the points of time 18:00 and 18:30 is assigned to a jogging time, and 60 minutes between the points of time 18:30 and 19:30 is assigned to a yoga time. Here, yoga has a lower load than jogging.

That is, the activity schedule 81 is changed to include tasks easier to be accomplished in terms of physical strength than the original activity schedule 61 in which 60 minutes between the points of time 18:00 and 19:00 is assigned to a jogging time.

This is because it is considered that since the user was not able to jog on April 30 being the previous day of May 1, jogging for 60 minutes in accordance with the original activity schedule 61 on May 1 being the next day is difficult to be performed in terms of physical strength.

In the activity schedule 82 on May 2, 45 minutes between the points of time 18:00 and 18:45 is assigned to a jogging time, and 30 minutes between the points of time 18:45 and 19:15 is assigned to a yoga time.

In the activity schedule 82, a sport having a higher load than the activity schedule 81 being the previous day is scheduled. Thus, the activity schedule 82 is set to become closer to the original activity schedule 61.

Further, in the activity schedule 83 since May 3, 60 minutes between the points of time 18:00 and 19:00 is assigned to a jogging time. Thus, the activity schedule 83 is set to be the same as the original activity schedule 61.

As mentioned above, for example, even when the user did not (was not able to) follow the original activity schedule 61 and was not able to jog on April 30, the new activity schedules 81 to 83 presented after that enables the user to reasonably act in accordance with the original activity schedule 61.

Therefore, since it becomes possible for the user to act in accordance with the activity schedule 61 until July 1, the user can accomplish the aim with a high degree of success.

Next, FIG. 6 shows an example of an estimation method of estimating whether or not the user acted in accordance with the original activity schedule 61.

It should be noted that also regarding the activity schedules 81 to 83, the same estimation method as in the activity schedule 61 is used. Therefore, in FIG. 6, only the estimation method using the activity schedule 61 will be described, and the descriptions on the estimation methods using other activity schedules will be appropriately omitted hereinafter.

FIG. 6 shows an upper tier, a lower tier, an expected amount of activity, an actual amount of activity, and (absolute value of) a difference between the expected amount of activity and the actual amount of activity. In the upper tier, activities to be done by the user are classified. In the lower tier, contents of upper-tier items are segmentalized. The expected amount of activity is one that is expected to be obtained when each of the activities described in the lower tier is performed. The actual amount of activity indicates an amount of activity measured when the activity was actually performed.

The processor 22 calculates a difference between an expected amount of activity described in the original activity schedule 61 and an actual amount of activity from the measurement unit 21. Then, based on the calculated difference and the expected amount of activity described in the activity schedule 61, the processor 22 calculates a deviation degree indicative of a deviation of the actual amount of activity with respect to the expected amount of activity. It should be noted that the deviation degree is, for example, a division result obtained by dividing the difference by the expected amount of activity.

Specifically, for example, as shown in FIG. 6, the processor 22 obtains an expected amount of activity 1800 of jogging based on the activity schedule 61. Further, the processor 22 obtains an actual amount of activity 500 measured by the measurement unit 21 between the points of time 18:00 and 19:00 between which jogging is to be carried out.

Then, the processor 22 calculates a difference 1300 between the expected amount of activity 1800 obtained from the activity schedule 61 and the actual amount of activity 500 measured by the measurement unit 21. By dividing the calculated difference 1300 by the expected amount of activity 1800, the processor 22 calculates a division result 0.72 (=1300/1800) as a deviation degree of a lower-tier item "Jogging."

As shown in FIG. 6, as in the lower-tier item "Jogging," the processor 22 calculates deviation degrees with respect to other lower-tier items.

Based on whether or not the deviation degree calculated for each of the activities described in the lower tier is smaller than a predetermined threshold value, the processor 22 estimates whether or not the user acted in accordance with the activity schedule 61.

That is, for example, when determined that the calculated deviation degree is smaller than the threshold value, the processor 22 estimates that the user acted in accordance with the activity schedule 61. On the other hand, when determined that the calculated deviation degree is equal to or larger than the threshold value, the processor 22 estimates that the user did not act in accordance with the activity schedule 61.

Specifically, for example, provided that the threshold value is 0.2, a deviation degree 0.72 of the lower-tier item "Jogging" is larger than the threshold value 0.2, and deviation degrees 0.1, 0.07, and 0.1 of other lower-tier items "Breakfast," "Lunch," and "Dinner" are all smaller than the threshold value 0.2. It should be noted that since a lower-tier item "Yoga" is not described in the activity schedule 61, values of items corresponding to the lower-tier item "Yoga" are set to 0 for the sake of convenience.

In this case, in the processor 22, it is estimated that the user had "Breakfast," "Lunch," and "Dinner" in accordance with the activity schedule 61, but did not jog.

[Operation Explanation of Information Processing Apparatus 1]

Next, referring to a flowchart in FIG. 7, activity schedule creation processing performed by the information processing apparatus 1 will be described.

This activity schedule creation processing is started, for example, when the user inputs an aim, a period, and the like by making an input operation using the operation unit 25. At this time, the operation unit 25 supplies an operation signal corresponding to the input operation by the user to the processor 22.

In Step S21, in response to the operation signal from the operation unit 25, the processor 22 refers to the initial setting table 41 stored in the database 23, and reads out the initial activity schedule 61 retrieved and selected from the database 23.

In Step S22, the activity schedule 61 read out in Step S21 is supplied to the display unit 24 for display. Accordingly, the user will act in accordance with the activity schedule 61 displayed on the display unit 24 as much as possible.

In Step S23, the measurement unit 21 measures an actual amount of activity of the user, and supplies it to the processor 22 together with a time when the actual amount of activity is measured. Then, the processing proceeds to Step S24.

In Step S24, based on a time counted by a built-in time counter (not shown), the processor 22 determines whether or not a day has passed, that is, for example, whether or not it is after midnight. When determined that a day has not passed, the processing returns to Step S23 and then the same processing is executed again.

Further, in Step S24, when determined that a day has passed based on the time counted by the built-in time counter (not shown), the processor 22 causes the processing to proceed to Step S25.

In Step S25, based on the activity schedule 61 read out in Step S21 and the actual amount of activity and the time from the measurement unit 21, the processor 22 calculates a deviation degree for each of the activities described in the activity schedule 61.

In Step S26, based on whether or not the calculated deviation degree is smaller than a predetermined threshold value, the processor 22 estimates whether or not an activity of the user was based on the activity schedule 61. Then, when estimated that the activity of the user was based on the activity schedule 61, the processor 22 returns the processing to Step S23, and then executes the same processing again.

Further, in Step S26, when estimated that the activity of the user did not follow the activity schedule 61 based on whether or not the calculated deviation degree is smaller than the threshold value, the processor 22 causes the processing to proceed to Step S27.

In Step S27, the processor 22 creates the new activity schedules 81 to 83 for accomplishing the aim from a current state of the user. In Step S28, the activity schedules 81 to 83 are supplied to the display unit 24 for display. After that, the processing returns to Step S23, and then the same processing is executed again. Subsequently, the activity schedule creation processing is ended.

As described above, in the activity schedule creation processing, when the user was not able to act in accordance with the original activity schedule 61, the activity schedules 81 to 83 such that the user can reasonably act in accordance with the activity schedule 61 are created based on the current state of the user and presented to the user.

Therefore, even when the user was not able to act in accordance with the original activity schedule 61, it becomes possible for the user to reasonably act in accordance with the original activity schedule 61. Thus, the user can accomplish the aim with a high degree of success.

Further, for example, even when the user was not able to act in accordance with the original activity schedule 61, the new activity schedules 81 to 83 to be followed by the user after that are presented to the user. Thus, the user can perform activities to do for accomplishing the aim without hesitation.

In the activity schedule creation processing, the deviation degree between the activity of the user and the activity schedule is calculated after a day has passed. However, alternatively, for example, every time a period of time in which an activity described in the activity schedule is to be performed has been elapsed, whether or not the activity was performed by the user may be estimated.

In this case, it becomes possible for the processor 22 to more quickly know whether or not the user acted in accordance with the activity schedule. Thus, it becomes possible to create the latest activity schedule matching a state of the user and to display it on the display unit 24.

Further, in the first embodiment, in each of the activity schedules 81 and 82 shown in FIG. 5, a yoga time is set. However, alternatively, for example, the yoga time does not need to be set. In this case, as compared to the case where the yoga time is set, an activity schedule easier for the user to carry out is obtained.

In addition, in the first embodiment, the description has been made on the case where a single activity (hereinabove, jogging) was not performed in accordance with the original activity schedule 61.

However, for example, in the case where the user was not able to perform a plurality of activities in accordance with the activity schedule 61, the processor 22 will create, for example, the activity schedules 81 to 83 such that the plurality of activities become closer to those in the activity schedule 61 at approximately the same rate.

Alternatively, for example, with respect to an activity having a larger deviation degree, the processor 22 may increase a rate for causing an activity to become closer to that described in the activity schedule 61.

(2. Second Embodiment)

Next, referring to FIGS. 8 to 10, an example in which with respect to a lower-tier item having a larger difference an activity is preferentially modified to become closer that in the original activity schedule 61 will be described.

FIG. 8 shows another example of the activity schedule in which tasks to do for each day during a period between April 1 and July 1 are described.

It should be noted that an activity schedule 101 has the same configuration as the activity schedule 61 except for a change from (time, activity)=(18:00-19:00, Sport (jogging), 1800) described in the activity schedule 61 shown in FIG. 3 to (18:00-18:30, Sport (jogging), 900) and (18:30-19:00, Sport (yoga), 300).

FIG. 9 shows another example of the estimation method of estimating whether or not the user acted in accordance with the original activity schedule 61. It should be noted that FIG. 9 has the same configuration as in FIG. 6 except that numerals and the like of items differ.

In FIG. 9, for example, provided that the threshold value is 0.2, a deviation degree 0.88 of a lower-tier item "Jogging" and a deviation degree 0.83 of a lower-tier item "Yoga" are both larger than the threshold value 0.2, and deviation degrees 0.1, 0.07, and 0.1 of other lower-tier items "Breakfast," "Lunch," and "Dinner" are smaller than the threshold value 0.2.

In this case, in the processor 22, it is estimated that the user had "Breakfast," "Lunch," and "Dinner" in accordance with the activity schedule 61, but did not carry out jogging and yoga.

Thus, the processor 22 will create, based on a state of the user in which the user did not carry out jogging and yoga, new activity schedules that are gradually closer to the original activity schedule 101.

As shown in FIG. 9, a deviation degree of the lower-tier item "Jogging" is 0.88, and a deviation degree of the lower-tier item "Yoga" is 0.83. Thus, the processor 22 creates, for example, activity schedules 121 to 126 for modifying the jogging task to be the same as the original activity schedule 101 earlier than yoga.

Next, FIG. 10 show examples of the activity schedules 121 to 126 in which tasks since the next day of April 30, that is, tasks for two months between May 1 and July 1 are described.

In FIGS. 10A to 10F, activity schedules 121, 122, 123, 124, 125, and 126 indicate schedules in which tasks on May 1, tasks on May 2, tasks on May 3, tasks on May 4, tasks on May 5, and tasks since May 6 are described, respectively. It should be noted that the activity schedule 126 is the same as the original activity schedule 101.

In the activity schedules 121 to 126, tasks are set such that for each day, a time "Jogging" having a largest deviation degree increases by 10 minutes and a time "Yoga" having a second largest deviation degree increases by five minutes so as to finally become the same as those in the original activity schedule 101 (126).

That is, in the activity schedules 121 to 126, tasks are set such that the time "Jogging" having the largest deviation degree is caused to become the same as the original activity schedule 101 (126) in priority to the time "Yoga" having the second largest deviation degree.

As described above, in the second embodiment, it becomes possible to create the activity schedules 121 to 126 such that a task having a larger deviation degree is preferentially caused to become the same as a task in the original activity schedule 101.

By the way, it is desirable that the processor 22 create the activity schedules 121 to 126 such that a task (lower-tier item) more important for accomplishing the aim of the user is preferentially caused to become the same as a task in the original activity schedule 101.

Therefore, with respect to a task more important for accomplishing the aim of the user, a weight to be multiplied by the deviation degree is increased. Then, the processor 22 may create the activity schedules 121 to 126 such that a task having a larger deviation degree that has been multiplied by the weight is preferentially caused to become the same as a task in the original activity schedule 101.

Accordingly, a task more important for accomplishing the aim of the user is more rapidly caused to become the same as a task in the original activity schedule 101. Thus, it becomes easier for the user to accomplish the aim.

It should be noted that for example, weights are stored in advance in the database 23 while associated with the original activity schedule 101, and the processor 22 reads out a weight from the database 23 and multiplies the read-out weight by a calculated deviation degree.

For example, in the above-mentioned second embodiment, even when the user acted without following the activity schedule 101, the information processing apparatus 1 directs the user so that the user can reasonably act in accordance with the original activity schedule 101. The same is true in the first embodiment.

However, for example, in the second embodiment, when the user is often not able to act in accordance with the activity schedule presented by the information processing apparatus 1, it is estimated that the original activity schedule 101 is inappropriate for the user.

In this case, even if the activity schedules 121 to 126 that finally become the same as the original activity schedule 101 are set to be newly presented to the user when the user was not able to act in accordance with the original activity schedule 101, the user will not be able to accomplish the aim.

Therefore, for example, when the original activity schedule 101 is inappropriate for the user, it is desirable that the processor 22 update the original activity schedule 101.

(3. Third Embodiment)

Next, referring to FIGS. 11 and 12, an example in the case where the original activity schedule 101 is updated when the processor 22 determines that the original activity schedule 101 is inappropriate for the user will be described.

FIG. 11 shows still another example of the estimation method of estimating whether or not the user acted in accordance with the original activity schedule 101. It should be noted that FIG. 11 has the same configuration as FIG. 9 except that numerals and the like of items differ.

In FIG. 11, for example, provided that the threshold value is 0.2, a deviation degree 0.38 of a lower-tier item "Jogging" is larger than the threshold value 0.2, and deviation degrees 0.03, 0.1, 0.07, and 0.1 of other lower-tier items "Yoga," "Breakfast," "Lunch," and "Dinner" are all smaller than the threshold value 0.2.

In this case, in the processor 22, it is estimated that the user had "Breakfast," "Lunch," and "Dinner" and carried out "Yoga" in accordance with the activity schedule 101, but did not jog.

Then, the processor 22 creates activity schedules 121 to 126, as shown in FIG. 10, for example, to enable the user to reasonably act in accordance with the original activity schedule 101.

However, when in a history of estimation results in the past, the processor 22 has often estimated that the user had "Breakfast," "Lunch," and "Dinner" and carried out "Yoga" in accordance with the activity schedule 101, but did not jog it is estimated that the original activity schedule 101 is inappropriate for the user.

Specifically, for example, since a deviation degree of the lower-tier item "Jogging" is 0.38 and a deviation degree of the lower-tier item "Yoga" is 0.03, it can be determined that the user is relatively good at yoga, but not good at jogging.

In such a case, based on the history of the estimation results in the past, the processor 22 creates activity schedules 141 to 143 and updates the original activity schedule 61 to the new activity schedule 143 through the activity schedules 141 and 142.

Next, FIG. 12 show examples of the activity schedules 141 to 143 in which tasks since the next day of April 30, that is, tasks for two months between May 1 and July 1 are described.

In FIGS. 12A to 12C, the activity schedules 141, 142, 143 indicate schedules in which tasks on May 1, tasks on May 2, tasks since May 3 are described, respectively. It should be noted that the activity schedule 143 is set to differ from the original activity schedule 101.

Specifically, in the activity schedules 141 to 143, the schedule appropriate for the user is set by decreasing the time of jogging at which the user is not good and increasing the time of yoga at which the user is good.

As described above, in the third embodiment, when the original activity schedule 101 is inappropriate for the user, the original activity schedule 101 is set to be updated to the activity schedule 143 appropriate for the user through the activity schedules 141 and 142.

Therefore, even when the original activity schedule 101 is inappropriate for the user or becomes inappropriate for the user due to a change of the activity pattern and the like of the user, the original activity schedule 101 is updated to an activity schedule appropriate for the user. Thus, it becomes possible for the user to accomplish the aim with a high degree of success.

It should be noted that when the user was not able to act in accordance with the activity schedules 141 to 143 obtained by the update, new activity schedules that finally become the same as the activity schedule 143 are created as in the cases described in the first and second embodiments.

(4. Modified Example)

In the first to third embodiments, depending on the deviation degree of the actual amount of activity with respect to the expected amount of activity, the activity schedule to be presented to the user is changed. However, alternatively, for example, depending on a deviation between a time described in the activity schedule and a time when the user actually acted, the activity schedule to be presented to the user may be changed.

That is, for example, in the first embodiment, when the actual amount of activity between the points of time 18:30 and 19:30 on April 30 is (approximately) the same as the expected amount of activity of jogging, the processor 22 determines that jogging was carried out with a delay of 30 minutes with respect to the jogging task described in the original activity schedule 61.

In this case, the processor 22 calculates 30 minutes as a deviation degree in the jogging time (period of time), and estimates whether or not the user acted in accordance with the activity schedule 61, based on whether or not the calculated 30 minutes is smaller than a predetermined threshold value.

Here, provided that the threshold value is 10 minutes to be compared to 30 minutes being the calculated time, the processor 22 determines that the calculated 30 minutes is larger than the threshold value being 10 minutes. Further, based on the determination result, the processor 22 estimates that the user did not act in accordance with the activity schedule 61.

Then, based on the estimation that the user did not act in accordance with the activity schedule 61, the processor 22 creates the new activity schedules 81 to 83 in which tasks such that the jogging time is gradually closer to the original activity schedule 61 are set.

Specifically, for example, in the first embodiment, jogging is scheduled between the points of time 18:20 and 19:20 in the activity schedule 81 on May 1, and jogging is scheduled between the points of time 18:10 and 19:10 in the activity schedule 82 on May 2. Then, in the activity schedule 83 since May 3, jogging is scheduled between the points of time 18:00 and 19:00 so that the activity schedule 83 becomes the same as the original activity schedule 61.

In the first to third embodiments, the deviation degree is used as an offset degree indicative of an offset between the expected amount of activity and the actual amount of activity. However, the offset degree is not limited to the deviation degree. The same is true of a deviation between the time (period of time) described in the activity schedule and the time when the user actually acted.

Further, in the second embodiment, with respect to a task more important for accomplishing the aim of the user, a weight to be multiplied by the deviation degree indicative of the deviation between the expected amount of activity and the actual amount of activity is increased. Similarly, with respect to a task more important for accomplishing the aim of the user, a weight to be multiplied by the deviation degree indicative of the deviation between the jogging time or the like and the time when the user actually acted may be increased.

Further, in the first embodiment, for example, when the user did not jog in accordance with the original activity schedule 61, the processor 22 immediately creates the new activity schedules 81 to 83. However, a timing for creating the activity schedules 81 to 83 is not limited thereto.

That is, for example, when statistically determined that the user did not jog based on a history regarding whether or not the user jogged for a predetermined period, the processor 22 may create the new activity schedules 81 to 83.

Further, for example, in the information processing apparatus 1, by displaying on the display unit 24 a message regarding, for example, whether the activity schedule that has been presented to the user is appropriate for the user, to thereby allow the user to input his or her opinion and the like by the use of the operation unit 25, a new activity schedule may be created considering the input opinion of the user and the like.

Figure 7:
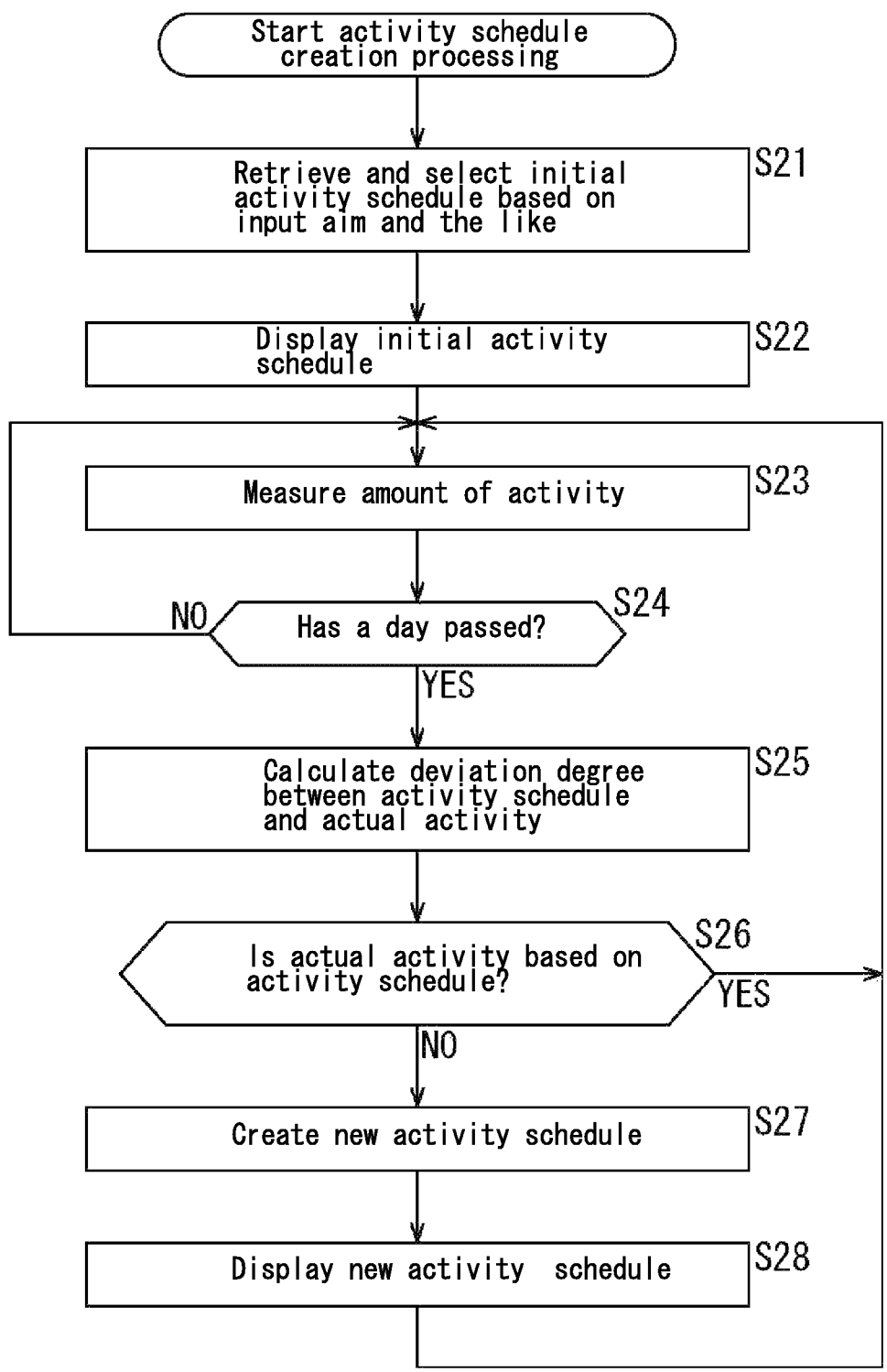
FIG. 7 is a flowchart for describing activity schedule creation processing performed by the information processing apparatus.

In the activity schedule creation processing in FIG. 7, on a day-to-day basis, the deviation degree between the activity of the user and the activity schedule is calculated to determine whether or not to create a new activity schedule. However, a period for calculating the deviation degree is not limited to one day.

That is, for example, when the aim of the user is to sleep before 9:00 PM only on a certain day, in other words, when the period is limited to the day, the period for calculating the deviation degree can be set to the single hour, for example.

It should be noted that the present disclosure can also take the following configuration.

(1) An information processing apparatus configured to create a schedule to be presented to a user, the apparatus including:
an estimation unit configured to estimate whether or not the user acts in accordance with a first schedule including a task to do for accomplishing a preset aim; and
a creation unit configured to create, when estimated that the user does not act in accordance with the first schedule, a new second schedule for accomplishing the aim from a state of the user who acts without following the first schedule.

(2) The information processing apparatus according to (1) above,
in which the creation unit creates the second schedule to become the same as the first schedule after a predetermined period of time.

(3) The information processing apparatus according to (1) above,
in which the creation unit creates the second schedule having similarity increasing as the period of time is elapsed, the similarity indicating a degree of similarity between a task included in the first schedule and a task included in the second schedule.

(4) The information processing apparatus according to (1) to (3) above,
in which the creation unit creates the second schedule based on an offset degree indicative of an offset between the task included in the first schedule and an activity of the user.

(5) The information processing apparatus according to (4) above,
in which the creation unit creates the second schedule in which the task is changed such that the similarity of the task increases in a priority order of the task based on the offset degree.

(6) The information processing apparatus according to (4) above, further including
a weighting unit configured to apply a weight associated with the task to the offset degree corresponding thereto,
in which the creation unit creates the second schedule based on the offset degree weighted for the task.

(7) The information processing apparatus according to (1) to (6) above, further including a measurement unit configured to measure activity information indicative of the activity of the user,
in which the estimation unit estimates, based on the activity information, whether or not the user acts in accordance with the first schedule.

(8) The information processing apparatus according to (1) above,
in which the creation unit creates, based on a history of an estimation result of the estimation unit, the second schedule different from the first schedule.

By the way, the series of processing described above may be executed by hardware or software. When the series of processing is executed by the software, a program configuring the software is installed from a program recording medium into a computer incorporated in dedicated hardware, a general-purpose computer or the like capable of executing various functions by installing various programs, or the like.

[Configuration Example of Computer]

Figure 13:
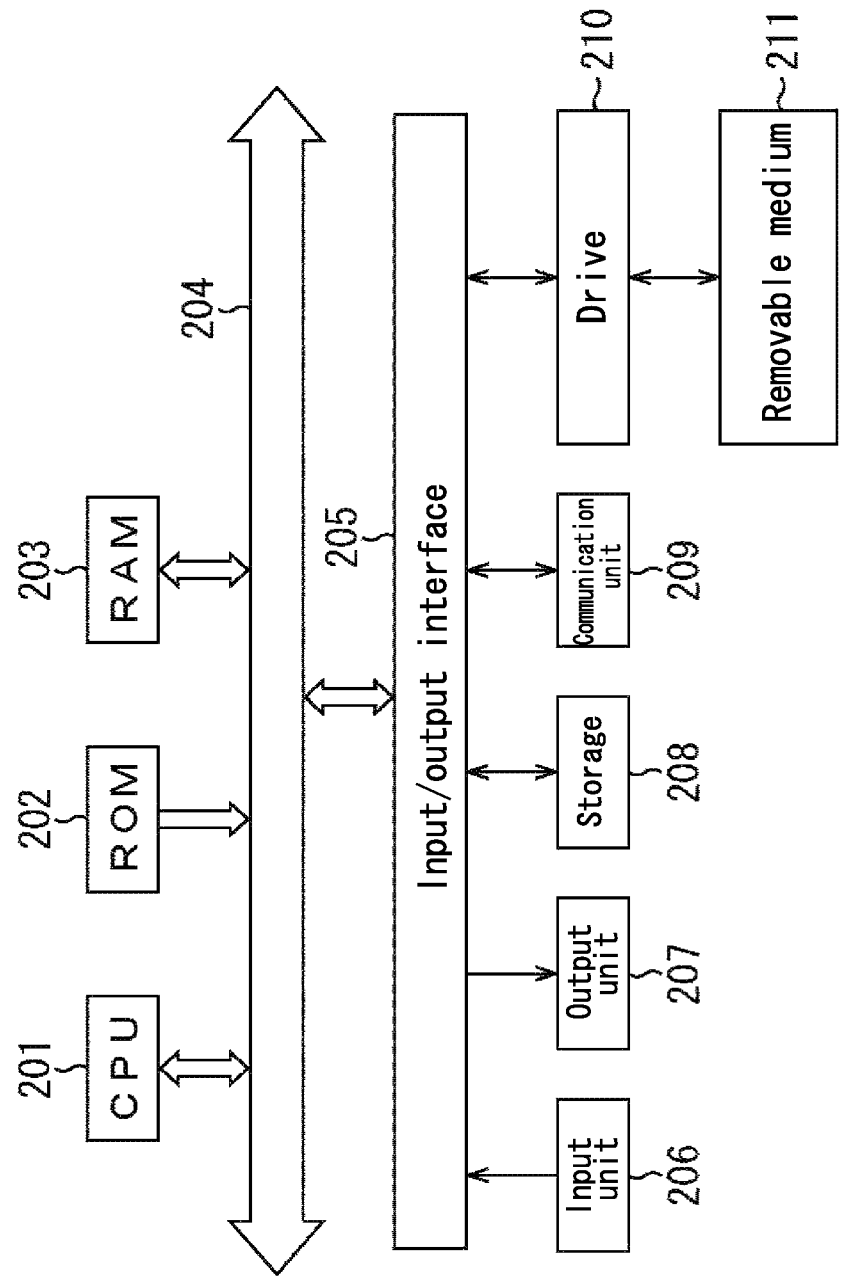
FIG. 13 is a block diagram showing a configuration example of a computer.

FIG. 13 is a block diagram showing a configuration example of hardware of a computer that executes the series of processing described above by a program.

A CPU (Central Processing Unit) 201 executes various types of processing according to the program stored in a ROM (Read Only Memory) 202 or a storage 208. In a RAM (Random Access Memory) 203, a program, data, and the like to be executed by the CPU 201 are appropriately stored. The CPU 201, the ROM 202, and the RAM 203 are connected to each other via a bus 204.

Also to the CPU 201, an input/output interface 205 is connected via the bus 204. To the input/output interface 205, an input unit 206 including a keyboard, a mouse, a microphone, and the like, and an output unit 207 including a display, a speaker, and the like are connected. The CPU 201 executes various types of processing in response to an instruction input through the input unit 206. Then, the CPU 201 outputs a processing result to the output unit 207.

The storage 208 connected to the input/output interface 205 includes, for example, a hard disk. The storage 208 stores a program and various types of data to be executed by the CPU 201. A communication unit 209 communicates with an external apparatus via a network such as an Internet or a local area network.

Further, it is also possible to acquire a program via the communication unit 209, and store it in the storage 208.

When a removable medium 211 such as a magnetic disk, an optical disk, a magneto optical disk, and a semi-conductor memory is loaded, a drive 210 connected to the input/output interface 205 drives it, to thereby acquire a program, data, and the like recorded thereon. The acquired program and data are transferred to the storage 208 depending on needs and stored therein.

The recording medium for recording (storing) a program which is installed into the computer so to be executable by the computer includes, as shown in FIG. 13, the removable medium 211 being a package medium such as a magnetic disk (including flexible disk), an optical disk (including CD-ROM (Compact Disc-Read Only Memory) and DVD (Digital Versatile Disc)), an magneto optical disk (including MD (Mini-Disc)), a semi-conductor memory, and the like, a ROM 202 in which the program is temporarily or permanently stored, a hard disk constituting the storage 208, and the like. The program is recorded on the recording medium using a wired or wireless communication medium such as a local area network, an Internet, and a digital satellite broadcasting, if necessary, via the communication unit 209 being an interface such as a router and a modem.

It should be noted that herein, although steps describing the series of processing described above can be performed in time series in the described order as a matter of course, these do not necessarily need to be processed in time series. The steps also include processing executed in parallel or individually.

Further, the present disclosure is not limited to the above-mentioned first to third embodiments, and various modifications can be made without departing from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
   an estimation unit configured to:
      estimate whether a user acts in accordance with a first schedule, wherein the first schedule comprises a task to be performed to accomplish a preset aim,
      calculate a deviation degree indicative of a deviation of an actual amount of activity with respect to an expected amount of activity corresponding to the task, and
      estimate whether the user acts in accordance with the first schedule based on whether the deviation degree is smaller than a predetermined threshold; and
   a creation unit configured to create, when estimated that the user does not act in accordance with the first schedule, a second schedule to accomplish the preset aim from a state of the user who does not act in accordance with the first schedule,
   wherein the creation unit creates the second schedule such that a degree of similarity between the task included in the first schedule and the task included in the second schedule increases as a period of time is elapsed.

2. The information processing apparatus according to claim 1, wherein the creation unit creates the second schedule to become same as the first schedule after a predetermined period of time.

3. The information processing apparatus according to claim 1, wherein the creation unit creates the second schedule based on an offset degree indicative of an offset between the task included in the first schedule and the actual amount of activity of the user.

4. The information processing apparatus according to claim 3, wherein the creation unit creates the second schedule in which the task is changed such that the degree of similarity of the task in the first schedule and the second schedule increases in a priority order of the task based on the offset degree.

5. The information processing apparatus according to claim 3, further comprising a weighting unit configured to apply a weight associated with the task to the offset degree corresponding thereto, wherein the creation unit creates the second schedule based on the offset degree weighted for the task.

6. The information processing apparatus according to claim 1, further comprising a measurement unit configured to measure activity information indicative of the actual amount of activity of the user based on detection of motion and pulse of the user, wherein the estimation unit estimates, based on the activity information, whether the user acts in accordance with the first schedule.

7. The information processing apparatus according to claim 1, wherein the creation unit creates, based on a history of an estimation result of the estimation unit, the second schedule different from the first schedule.

8. An information processing method for an information processing apparatus, the information processing method comprising:
   estimating whether the user acts in accordance with a first schedule, wherein the first schedule comprises a task to be performed to accomplish a preset aim;
   calculating a deviation degree indicative of a deviation of an actual amount of activity with respect to an expected amount of activity corresponding to the task; estimating whether the user acts in accordance with the first schedule based on whether the deviation degree is smaller than a predetermined threshold; and
   creating, when estimated that the user does not act in accordance with the first schedule, a second schedule to accomplish the preset aim from a state of the user who does not act in accordance with the first schedule,
   wherein the second schedule is created such that a degree of similarity between the task included in the first schedule and the task included in the second schedule increases as a period of time is elapsed.

9. A non-transitory computer-readable storage medium having stored thereon, a computer program having at least one code section for information processing, the at least one code section being executable by a computer for causing the computer to perform steps comprising:
   estimating whether the user acts in accordance with a first schedule, wherein the first schedule comprises a first task to be performed to accomplish a preset aim,
   calculating a deviation degree indicative of a deviation of an actual amount of activity with respect to an expected amount of activity corresponding to the task;
   estimating whether the user acts in accordance with the first schedule based on whether the deviation degree is smaller than a predetermined threshold; and
   creating, when estimated that the user does not act in accordance with the first schedule, a second schedule to accomplish the preset aim from a state of the user who does not act in accordance with the first schedule,
   wherein the second schedule is created such that a degree of similarity between the task included in the first schedule and the task included in the second schedule increases as a period of time is elapsed.

\* \* \* \* \*